(12) United States Patent
Brown et al.

(10) Patent No.: US 8,850,798 B2
(45) Date of Patent: Oct. 7, 2014

(54) PARTICULATE FILTER REGENERATION METHOD

(75) Inventors: David B. Brown, Brighton, MI (US); Stuart R. Smith, Howell, MI (US)

(73) Assignee: GM Global Technology Operations LLC

( * ) Notice: Subject to any disclaimer, the term of this patent is extended or adjusted under 35 U.S.C. 154(b) by 376 days.

(21) Appl. No.: 13/105,287

(22) Filed: May 11, 2011

(65) Prior Publication Data
US 2012/0285141 A1    Nov. 15, 2012

(51) Int. Cl.
*F01N 3/00* (2006.01)
*F02D 41/02* (2006.01)
*F02D 41/14* (2006.01)
*F01N 3/10* (2006.01)

(52) U.S. Cl.
CPC ...... *F02D 41/029* (2013.01); *F02D 2200/0812* (2013.01); *F02D 41/1454* (2013.01); *Y02T 10/22* (2013.01); *F02D 41/1446* (2013.01); *F02D 41/1475* (2013.01); *F01N 3/101* (2013.01); *F02D 41/025* (2013.01)
USPC ............... 60/295; 60/274; 60/286; 60/311; 703/5; 703/8

(58) Field of Classification Search
USPC ............ 60/274, 286, 295, 297, 311; 703/5, 8
See application file for complete search history.

(56) References Cited

U.S. PATENT DOCUMENTS

| | | | |
|---|---|---|---|
| 6,820,418 B2 * | 11/2004 | Nakatani et al. | 60/297 |
| 7,474,953 B2 * | 1/2009 | Hulser et al. | 701/108 |
| 7,533,524 B2 * | 5/2009 | Wang et al. | 60/297 |
| 7,677,032 B2 * | 3/2010 | Berryhill et al. | 60/297 |
| 8,341,947 B2 * | 1/2013 | Hepburn et al. | 60/297 |
| 8,384,397 B2 * | 2/2013 | Bromberg et al. | 324/636 |
| 2007/0056271 A1 | 3/2007 | Berryhill et al. | |

* cited by examiner

*Primary Examiner* — Binh Q Tran

(57) ABSTRACT

A regeneration system for a filter that filters exhaust gas of an engine includes a soot loading determination module that determines soot accumulation in the filter. A regeneration control module receives the determined soot accumulation from the soot loading determination module, compares the soot accumulation to a first soot accumulation threshold, and selectively increases oxidation levels in the exhaust gas in response to the comparison between the soot accumulation and the first soot accumulation threshold to initiate regeneration in the filter.

16 Claims, 4 Drawing Sheets

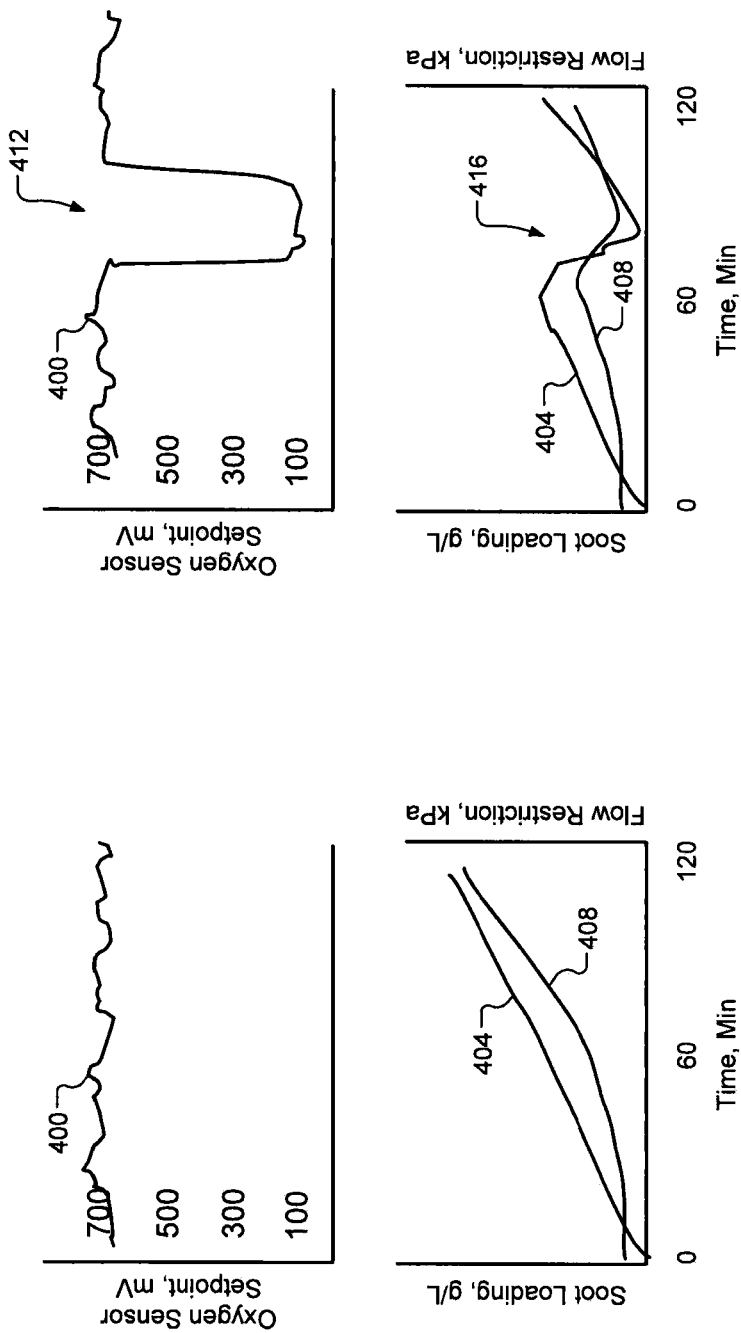

PARTICULATE FILTER REGENERATION METHOD

FIELD

The present disclosure relates to systems and methods for monitoring and reducing soot levels in a particulate filter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle propelled by an internal combustion engine may include a particulate filter (PF), such as a gasoline particulate filter (GPF) or a diesel particulate filter (DPF). The PF is arranged in an exhaust path of the engine and filters particulates (e.g., soot) from exhaust gas flowing through the exhaust path. Over time, soot and other particulates accumulate in the PF, and greater soot levels can restrict flow through the PF. Accordingly, the vehicle may implement one or more regeneration techniques to reduce the soot levels within the PF. For example only, regeneration may include igniting soot particles within the PF.

SUMMARY

A regeneration system for a filter that filters exhaust gas of an engine includes a soot loading determination module that determines soot accumulation in the filter. A regeneration control module receives the determined soot accumulation from the soot loading determination module, compares the soot accumulation to a first soot accumulation threshold, and selectively increases oxidation levels in the exhaust gas in response to the comparison between the soot accumulation and the first soot accumulation threshold to initiate regeneration in the filter.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A is a graph illustrating soot loading and flow restriction during normal operation according to the present disclosure; and FIG. 4B is a graph illustrating soot loading and flow restriction during regeneration according to the present disclosure.

DETAILED DESCRIPTION

Figure 1:
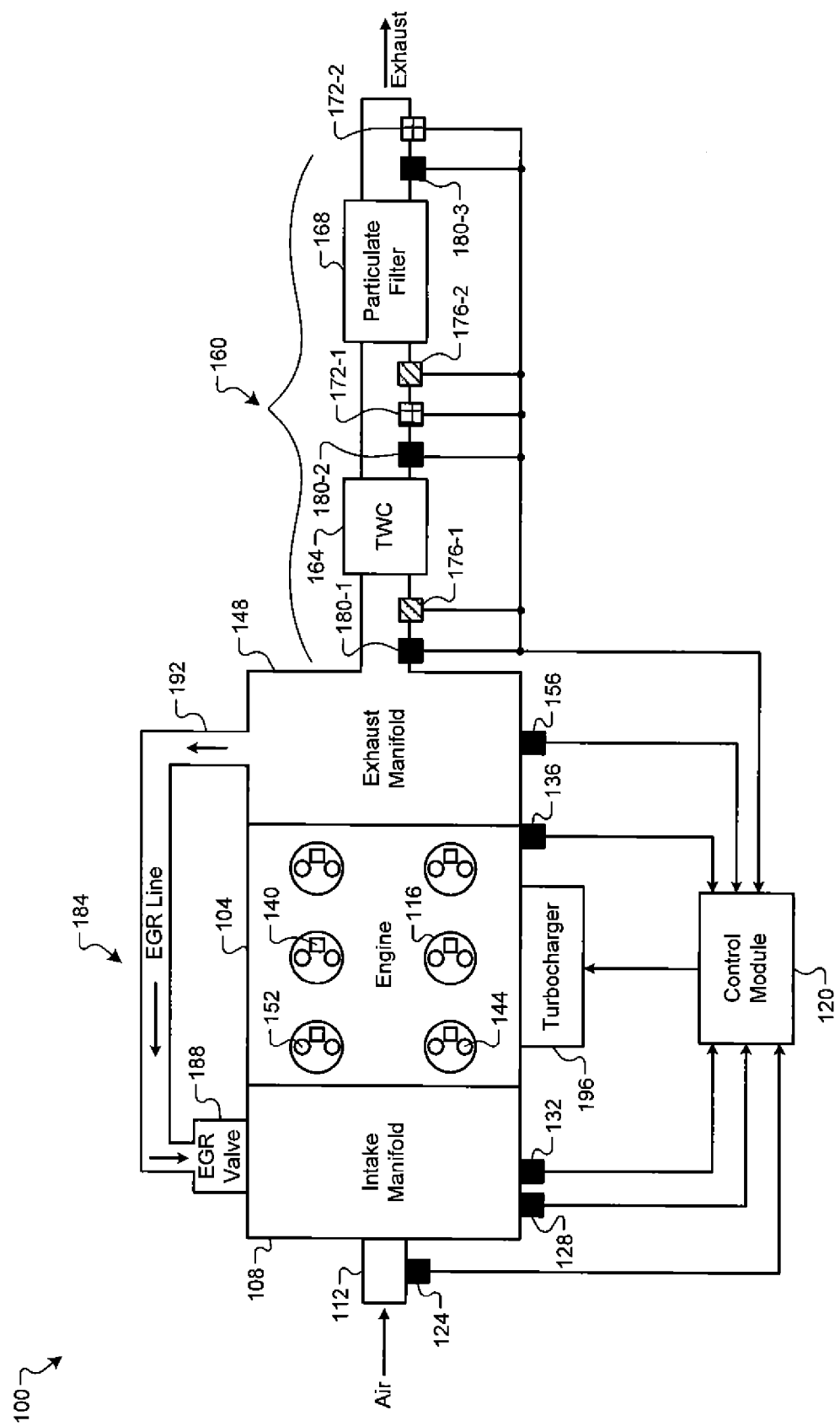
FIG. 1 is a functional block diagram of an engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Engines such as gasoline internal combustion engines typically operate at stoichiometric or rich air-to-fuel (NF) ratios, which correspond to lower levels of oxygen in the resultant exhaust gas. The relatively low levels of oxidants in the exhaust gas inhibit soot oxidation, leading to high soot accumulation in the particulate filter (PF). Various techniques to improve soot oxidation (e.g. increasing exhaust temperature) may damage a substrate of the PF and/or increase levels of other emissions such as nitrogen oxides (NO.). A PF regeneration system and method according to the present disclosure reduce the soot levels in the PF while using the accumulated soot in the PF to reduce NO emissions in the exhaust gas.

Referring now to FIG. 1, an exemplary engine system 100 is schematically illustrated in accordance with the present disclosure. The PF regeneration system and method described herein may be implemented in various engine systems that include a PF. For example only, the engine systems may include gasoline direct injection engine systems and homogeneous charge compression ignition engine systems or a diesel engine system.

The engine system 100 includes an engine 104 that combusts an air/fuel mixture to produce drive torque. Air is drawn into an intake manifold 108 through an inlet 112. A throttle (not shown) may be included to regulate air flow into the intake manifold 108. Air within the intake manifold 108 is distributed into cylinders 116. Although FIG. 1 depicts six cylinders 116, the engine 104 may include additional or fewer cylinders 116. For example only, engines having 4, 5, 8, 10, 12, and 16 cylinders are contemplated.

A control module 120 communicates with components of the engine system 100. The components may include the engine 104, sensors, and actuators as discussed herein. The control module 120 may implement the particulate filter control techniques of the present disclosure.

Air passes through the inlet 112 through a mass airflow (MAF) sensor 124. The MAF sensor 124 generates a MAF signal that indicates a rate of air flowing through the MAF sensor 124. A manifold pressure (MAP) sensor 128 is positioned in the intake manifold 108 between the inlet 112 and the engine 104. The MAP sensor 128 generates a MAP signal that indicates air pressure in the intake manifold 108. An intake air temperature (IAT) sensor 132 located in the intake manifold 108 generates an IAT signal based on intake air temperature.

An engine crankshaft (not shown) rotates at engine speed or a rate that is proportional to engine speed. A crankshaft sensor 136 senses a position of the crankshaft and generates a crankshaft position (CSP) signal. The CSP signal may be related to the rotational speed of the crankshaft and cylinder events. For example only, the crankshaft sensor 136 may be a variable reluctance sensor. The engine speed and cylinder events may be sensed using other suitable methods.

The control module 120 actuates fuel injectors 140 to inject fuel into the cylinders 116. An intake valve 144 selectively opens and closes to enable air to enter the cylinder 116. An intake camshaft (not shown) regulates the intake valve position. A piston (not shown) compresses and combusts the air/fuel mixture within the cylinder 116. The piston drives the crankshaft during a power stroke to produce drive torque. Exhaust gas resulting from the combustion within the cylinder 116 is forced out through an exhaust manifold 148 when an exhaust valve 152 is in an open position. An exhaust camshaft (not shown) regulates the exhaust valve position. An exhaust manifold pressure (EMP) sensor 156 generates an EMP signal that indicates exhaust manifold pressure. The control module 120 may determine a mass flow rate of the exhaust based on the rate of intake air from the MAF sensor 124 and a mass of fuel injected by the fuel injectors 140.

An exhaust treatment system 160 treats the exhaust. The exhaust treatment system 160 includes a three way catalyst (TWC) 164 and a particulate filter assembly 168, which may also be coated with a three way catalyst. The TWC 164 oxidizes carbon monoxide and hydrocarbons in the exhaust based on the post combustion air/fuel ratio. The amount of oxidation increases the temperature of the exhaust. The filter assembly 168 receives exhaust from the TWC 164 and filters any particulate matter present in the exhaust. The control module 120 controls the engine 104 and filter regeneration based on various sensed and/or estimated information.

The exhaust treatment system 160 may include exhaust pressure sensors 172-1 and 172-2 (collectively exhaust pressure sensors 172), oxygen sensors 176-1 and 176-2 (collectively oxygen sensors 176), and exhaust temperature sensors 180-1, 180-2, and 180-3 (collectively exhaust temperature sensors 180). The exhaust pressure sensors 172 generate signals that indicate pressures of the exhaust. The oxygen sensors 176 generate signals that indicate levels of oxygen in the exhaust. Alternatively, nitrogen oxides sensors (not shown) may be used to detect levels of oxygen in the exhaust.

The exhaust temperature sensors 180 measure the temperatures of the exhaust upstream from the TWC 164 and the filter assembly 168. The exhaust temperature sensors 180 may also measure the temperatures of the exhaust downstream from the filter assembly 168 or between the TWC 164 and the filter assembly 168. The exhaust temperature sensors 180 generate signals that indicate temperatures of the exhaust. The control module 120 estimates the temperature in the filter assembly 168 based on the temperatures of the exhaust received from the exhaust temperature sensors 180. For example only, the control module 120 may generate an exhaust temperature model to estimate temperatures of the exhaust throughout the exhaust treatment system 160. Alternatively, the control module 120 may receive the temperature in the filter assembly 168 from a temperate sensor (not shown) located in the filter assembly 168.

The engine system 100 may include an EGR system 184. The EGR system 184 includes an EGR valve 188 and an EGR line 192. The EGR system 184 may introduce a portion of exhaust gas from the exhaust manifold 148 into the intake manifold 108. The EGR valve 188 may be mounted on the intake manifold 108. The EGR line 192 may extend from the exhaust manifold 148 to the EGR valve 188, providing communication between the exhaust manifold 148 and the EGR valve 188. The control module 120 may actuate the EGR valve 188 to adjust an amount of exhaust gas introduced into the intake manifold 108.

The engine system 100 may include a turbocharger 196. The turbocharger 196 may be driven by the exhaust gas received through a turbine inlet. For example only, the turbocharger 196 may include a variable nozzle turbine. The turbocharger 196 increases airflow into the intake manifold to cause an increase in intake manifold pressure (i.e., boost pressure). The control module 120 actuates the turbocharger 196 to selectively restrict the flow of the exhaust gas, thereby controlling the boost pressure.

The control module 120 selectively initiates regeneration in one or more zones of the filter assembly 168 based on one or more characteristics (e.g. measured or estimated) of the engine system 100. For example only, the control module 120 controls regeneration of the filter assembly 168 based on signals received from the exhaust pressure sensors 172, the oxygen sensors 176, and the exhaust temperature sensors 180.

Based on the signals received from the oxygen sensor 176-1, the control module 120 may control oxygen levels in the exhaust gas to achieve a desired NF ratio during normal operation (e.g. when the filter assembly has low soot levels). The control module 120 monitors the signals received from the oxygen sensor 176-2 to determine whether the desired A/F ratio is achieved. For example only, during a normal operation mode the control module 120 may reduce the oxygen levels to achieve a rich A/F ratio (for example only, λ 0.995 with respect to a stoichiometric A/F ratio). For example, a rich A/F ratio (e.g. reduced oxygen levels) is desirable for controlling (i.e. reducing) NO levels. However, the reduced oxygen levels correspond to reduced oxidants in the exhaust gas, and therefore ineffective soot reduction.

Conversely, the control module 120 of the present disclosure initiates a regeneration mode to control the regeneration of the filter assembly 168, which may be coated in three way catalyst material, based on soot loading of the filter assembly 168 (e.g., measured or estimated soot loading) and exhaust temperatures to reduce both soot levels and $NO_x$ levels.

Figure 2:
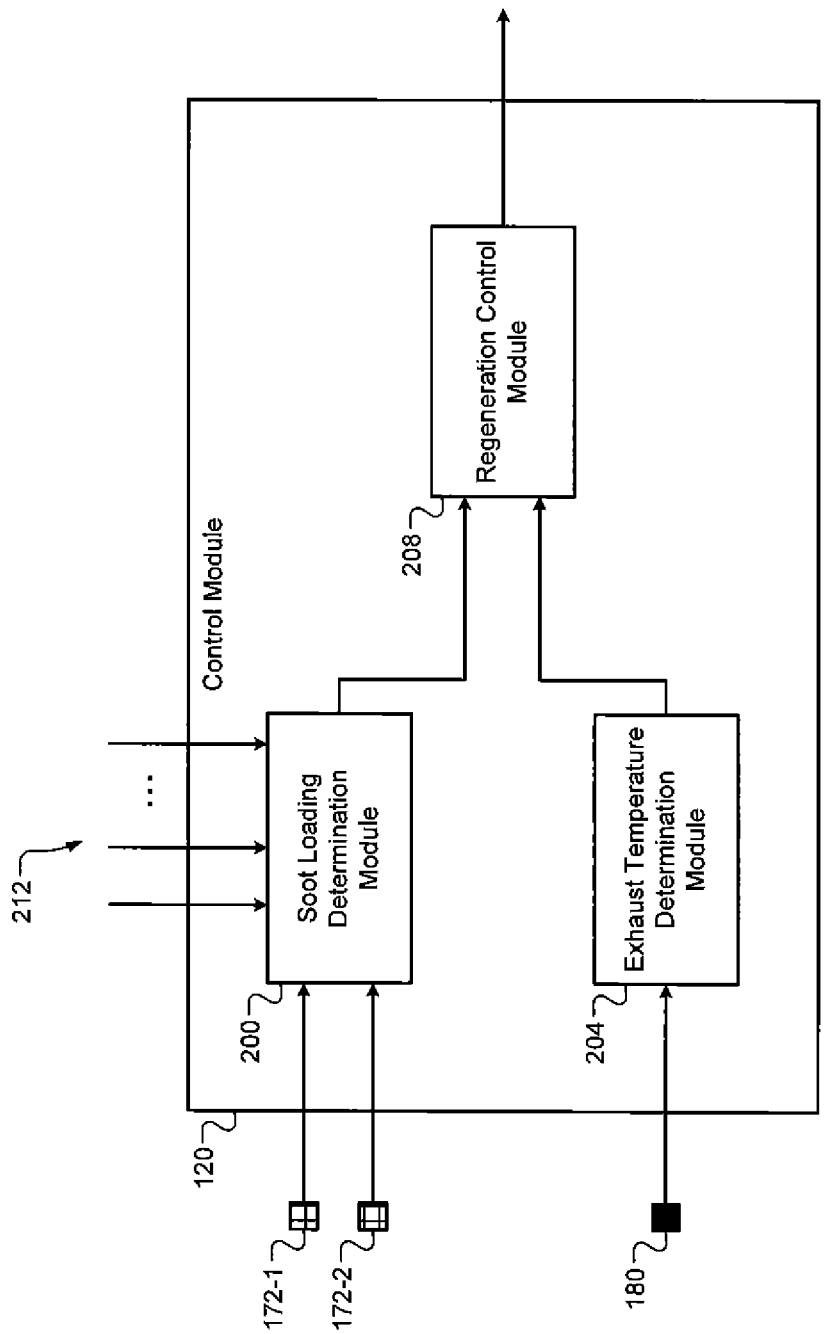
FIG. 2 is a functional block diagram of a control module that controls particulate filter regeneration according to the present disclosure.

Referring now to FIG. 2, the control module 120 includes a soot loading determination module 200, an exhaust temperature determination module 204, and a regeneration control module 208. The soot loading determination module 200 monitors one or more measured and/or estimated characteristics of the engine system 100 to determine soot loading (i.e. soot accumulation) in the filter assembly 168. The soot loading determination module 200 provides the determined soot accumulation to the regeneration control module 208. For example only, the soot loading determination module 200 determines a pressure drop across the filter assembly 168 based on signals received from the exhaust pressure sensors 172. A difference between exhaust pressures indicated by the exhaust pressure sensors 172 (e.g. an increase in exhaust pressures from the exhaust pressure sensor 172-1 to the exhaust pressure sensor 172-2) corresponds to increased soot accumulation. The soot loading determination module 200 determines soot accumulation based on the increase in exhaust pressures.

Alternatively, the soot loading determination module 200 may store and execute a model that estimates soot accumulation based on other characteristics 212 of the engine system 100. For example, the other characteristics 212 may include, but are not limited to, a time since a previous regeneration, exhaust temperatures, pressures, and oxygen levels, and/or exhaust manifold pressures.

The exhaust temperature determination module 204 monitors exhaust temperatures based on signals received from the exhaust temperature sensors 180. For example only, exhaust temperature at or above a predetermined temperature threshold may be desired to facilitate effective soot reduction during regeneration. For example only, the predetermined temperature threshold is 550° C. The exhaust temperature determination module 204 determines the exhaust temperature and provides the determined exhaust temperature to the regeneration control module 208.

The regeneration control module 208 initiates the regeneration of the filter assembly 168 based on the determined soot accumulation received from the soot loading determination module 200 and the determined exhaust temperature received from the exhaust temperature determination module 204. For example, the regeneration control module 208 compares the determined soot accumulation to a first predetermined soot accumulation threshold (e.g. an upper soot accumulation threshold), and compares the determined exhaust temperature to the predetermined temperature threshold. The regeneration control module 208 initiates the regeneration of the filter assembly 168 based on (e.g. in response to) the comparison between the determined soot accumulation and the upper soot accumulation threshold, and the comparison between the determined exhaust temperature and the predetermined temperature threshold. For example, the regeneration control module 208 initiates the regeneration of the filter assembly 168 when the determined soot accumulation is greater than or equal to the upper soot accumulation threshold and the determined exhaust temperature is greater than or equal to the predetermined temperature threshold.

To initiate the regeneration, the regeneration control module 208 increases oxygen levels in the exhaust gas to achieve an A/F ratio that is lean with respect to a stoichiometric A/F ratio. For example only, the regeneration control module 208 reduces a set point (e.g. a set point voltage) of the oxygen sensor 176-2. In response to the reduced set point of the oxygen sensor 176-2, a lean A/F ratio is induced in the exhaust gas. The lean A/F ratio results in an increase in oxidant levels in the exhaust gas flowing out of the TWC 164. Consequently, additional oxidants (e.g. NO and O2) are available to the filter assembly 168 for regeneration. For example, the three way catalyst material coating the filter assembly 168 stores the additional oxidants, and low levels of the oxidants are released from the three way catalyst material to react with the soot in the filter assembly 168 to facilitate the regeneration. For example only, the reaction reduces the NO to N2. In this manner, the soot accumulation in the filter assembly 168 is reduced while also reducing NO levels.

The soot loading determination module 200 continues to determine soot accumulation in the filter assembly 168 and provide the determined soot accumulation to the regeneration control module 208 during the regeneration. The regeneration control module 208 terminates the regeneration mode (e.g. reverts to the normal operation mode) based on the determined soot accumulation received from the soot loading determination module 200. For example, the regeneration control module 208 compares the determined soot accumulation to a second predetermined soot accumulation threshold (e.g. a lower soot accumulation threshold). The lower soot accumulation threshold may be less than the upper soot accumulation threshold. The regeneration control module 208 terminates the regeneration of the filter assembly 168 based on (e.g. in response to) the comparison between the determined soot accumulation and the lower soot accumulation threshold. For example, the regeneration control module 208 terminates the regeneration of the filter assembly 168 when the determined soot accumulation is less than or equal to the lower soot accumulation threshold. To terminate the regeneration, the regeneration control module 208 decreases oxygen levels in the exhaust gas. For example only, the regeneration control module 208 increases the set point of the oxygen sensor 176-2.

Figure 3:
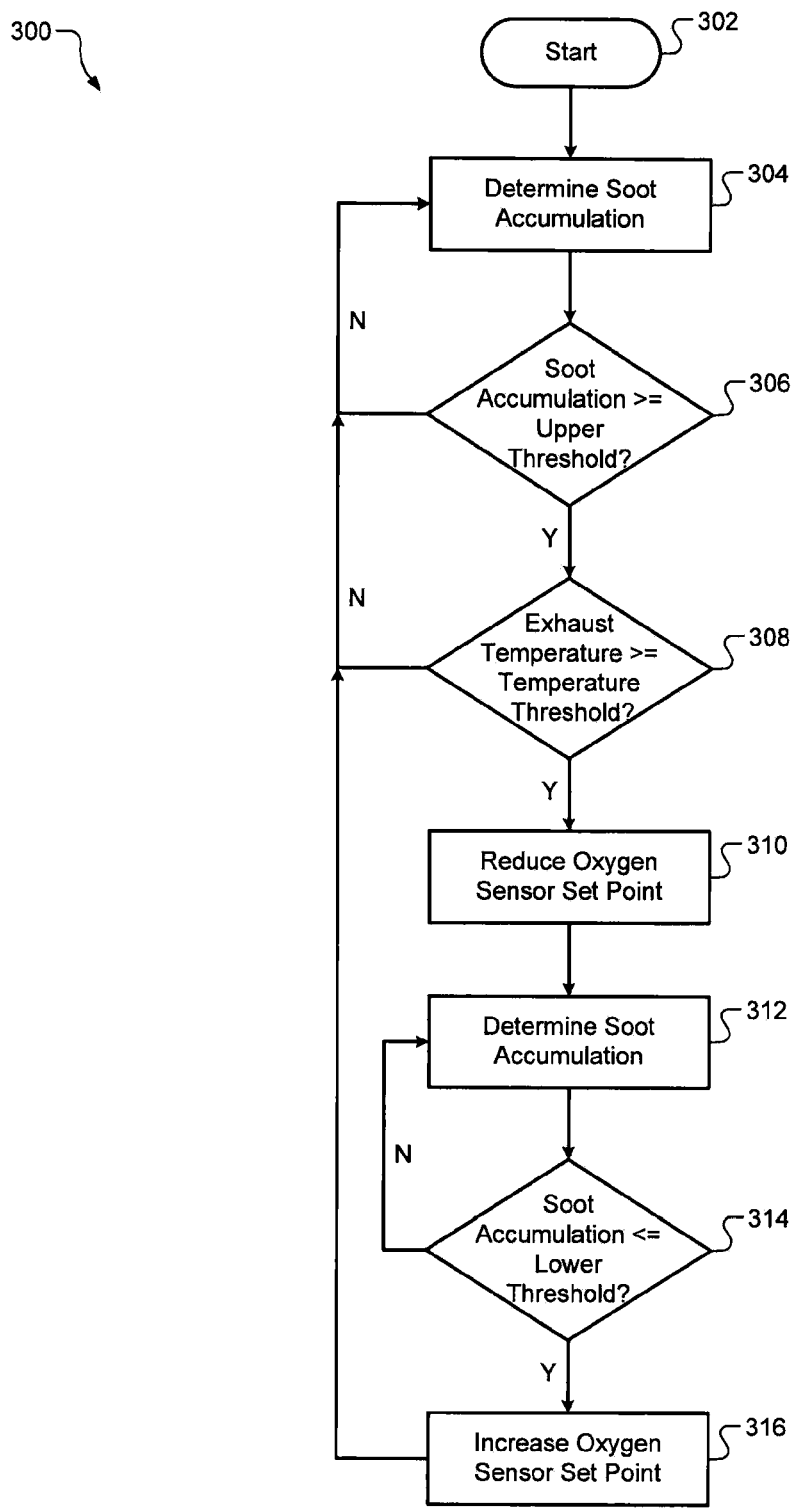
FIG. 3 is a flow diagram of a regeneration method according to the present disclosure.

Referring now to FIG. 3, a regeneration method 300 according to the present disclosure begins at 302. The method 300 determines the soot accumulation in the filter assembly 168 at 304. The method 300 determines whether the soot accumulation is greater than or equal to the upper soot accumulation threshold at 306. If true, the method 300 continues to 308. If false, the method 300 continues to 304. The method 300 determines whether the exhaust temperature is greater than or equal to the predetermined temperature threshold at 308. If true, the method 300 continues to 310. If false, the method 300 continues to 304. Accordingly, from 304 to 308 the method 300 monitors the soot accumulation until the soot accumulation is greater than or equal to the upper soot accumulation threshold and monitors the exhaust temperature until the exhaust temperature is greater than or equal to the predetermined temperature threshold.

The method 300 initiates the regeneration at 310. For example, the method 300 reduces the set point for the oxygen sensor 176-2 to increase oxidation levels in the exhaust gas. The method 300 determines the soot accumulation in the filter assembly 168 at 312. The method 300 determines whether the soot accumulation is less than or equal to the lower soot accumulation threshold at 314. If true, the method 300 continues to 316 to restore (i.e. increase) the set point for the oxygen sensor 176-2 to reduce oxidation levels in the exhaust gas, and proceeds to 304 to continue to monitor the soot accumulation. Alternatively, the method 300 may terminate be initiated at a later time. For example only, the method 300 may be initiated periodically and/or conditionally. If false, the method 300 continues to 312. Accordingly, from 312 to 314 the method 300 monitors the soot accumulation until the soot accumulation is less than or equal to the lower soot accumulation threshold.

Referring now to FIG. 4A, a setpoint 400 (e.g. a voltage setpoint, in millivolts) of the oxygen sensor 176-2 and corresponding soot loading 404 (in grams/liter) and flow restriction 408 (in kilopascals) during normal operation is shown. Referring now to FIG. 4B, the setpoint 400 is reduced at 412 to increase oxidation levels during regeneration. Consequently, the soot loading 404 and the flow restriction 408 are reduced as shown at 416.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A regeneration system for a filter that filters exhaust gas of an engine, the regeneration system comprising:
   a soot loading determination electronic circuit configured to determine soot accumulation in a filter; and
   a regeneration control electronic circuit configured to i) receive the determined soot accumulation from the soot loading determination electronic circuit, ii) selectively increase oxidation levels in the exhaust gas in response to a comparison between the soot accumulation and a first soot accumulation threshold to initiate regeneration in the filter, and iii) selectively decrease the oxidation levels in the exhaust gas, in response to a comparison between the soot accumulation and a second soot accumulation threshold, to terminate the regeneration in the filter.

2. The regeneration system of claim 1 wherein the regeneration control electronic circuit selectively increases the oxidation levels in the exhaust gas when the soot accumulation is greater than or equal to the first soot accumulation threshold.

3. A regeneration system for a filter that filters exhaust gas of an engine, the regeneration system comprising:
   a soot loading determination electronic circuit configured to determine soot accumulation in a filter;
   a regeneration control electronic circuit configured to receive the determined soot accumulation from the soot loading determination electronic circuit, compare the soot accumulation to a first soot accumulation threshold, and selectively increase oxidation levels in the exhaust gas, in response to the comparison between the soot accumulation and the first soot accumulation threshold, to initiate regeneration in the filter; and
   an exhaust temperature determination electronic circuit configured to determine a temperature of the exhaust gas, wherein the regeneration control electronic circuit receives the temperature, compares the temperature to a predetermined temperature threshold, and selectively increases the oxidation levels in the exhaust gas when the soot accumulation is greater than or equal to the first soot accumulation threshold and the temperature is greater than the predetermined temperature threshold.

4. The regeneration system of claim 1 wherein selectively increasing the oxidation levels includes adjusting a set point of an oxygen sensor that measures oxygen levels in the exhaust gas.

5. The regeneration system of claim 1 further comprising the filter, wherein the filter is coated in a three way catalyst material.

6. The regeneration system of claim 1 wherein, after selectively increasing the oxidation levels in the exhaust gas, the regeneration control electronic circuit compares the soot accumulation to a second soot accumulation threshold, and selectively decreases the oxidation levels in the exhaust gas in response to the comparison between the soot accumulation to the second soot accumulation threshold to terminate the regeneration in the filter.

7. The regeneration system of claim 6 wherein the regeneration control electronic circuit selectively decreases the oxidation levels in the exhaust gas when the soot accumulation is less than or equal to the second soot accumulation threshold.

8. The regeneration system of claim 6 wherein the second soot accumulation threshold is less than the first soot accumulation threshold.

9. A method for regenerating a filter that filters exhaust gas of an engine, the method comprising:
   using an electronic circuit:
     determining soot accumulation in the filter;
     comparing the soot accumulation to a first soot accumulation threshold;
     comparing the soot accumulation to a second soot accumulation threshold;
     selectively increasing oxidation levels in the exhaust gas in response to the comparison between the soot accumulation and the first soot accumulation threshold to initiate regeneration in the filter; and
     selectively decreasing oxidation levels in the exhaust gas, in response to the comparison between the soot accumulation and the second soot accumulation threshold, to terminate the regeneration in the filter.

10. The method of claim 9 further comprising selectively increasing the oxidation levels in the exhaust gas when the soot accumulation is greater than or equal to the first soot accumulation threshold.

11. The method of claim 9 further comprising:
    determining a temperature of the exhaust gas;
    comparing the temperature to a predetermined temperature threshold; and
    selectively increasing the oxidation levels in the exhaust gas when the soot accumulation is greater than or equal to the first soot accumulation threshold and the temperature is greater than the predetermined temperature threshold.

12. The method of claim 9 wherein selectively increasing the oxidation levels includes adjusting a set point of an oxygen sensor that measures oxygen levels in the exhaust gas.

13. The method of claim 9 further comprising coating the filter in a three way catalyst material.

14. The method of claim 9 further comprising, after selectively increasing the oxidation levels in the exhaust gas:
    comparing the soot accumulation to a second soot accumulation threshold; and
    selectively decreasing the oxidation levels in the exhaust gas in response to the comparison between the soot accumulation to the second soot accumulation threshold to terminate the regeneration in the filter.

15. The method of claim 14 further comprising selectively decreasing the oxidation levels in the exhaust gas when the soot accumulation is less than or equal to the second soot accumulation threshold.

16. The method of claim 14 wherein the second soot accumulation threshold is less than the first soot accumulation threshold.

* * * * *